(12) United States Patent
Settele

(10) Patent No.: US 7,118,146 B2
(45) Date of Patent: Oct. 10, 2006

(54) SKEWER

(75) Inventor: Ignaz Settele, Kaufbeuren (DE)

(73) Assignee: Maxpat Trading & Marketing (Far East) Ltd., Tsimshatsui (HK)

( * ) Notice: Subject to any disclaimer, the term of this patent is extended or adjusted under 35 U.S.C. 154(b) by 0 days.

(21) Appl. No.: 10/865,390

(22) Filed: Jun. 10, 2004

(65) Prior Publication Data

US 2005/0275231 A1    Dec. 15, 2005

(51) Int. Cl.
*A47J 37/04*    (2006.01)
(52) U.S. Cl. .......................... 294/61; 99/421 A; 16/434
(58) Field of Classification Search ................ 294/61, 294/26.5, 9, 10, 11, 12, 13, 14; 99/419, 421 A; 16/431, 434
See application file for complete search history.

(56) References Cited

U.S. PATENT DOCUMENTS

| | | | | |
|---|---|---|---|---|
| 272,472 A | * | 2/1883 | Post ............................ 16/434 |
| 441,343 A | * | 11/1890 | Warner ......................... 16/434 |
| 1,801,084 A | * | 4/1931 | Huie ............................ 30/129 |
| 1,857,841 A | * | 5/1932 | Engel ........................... 294/11 |
| 2,126,201 A | * | 8/1938 | McCall ........................ 16/434 |
| 2,187,145 A | * | 1/1940 | Brown .......................... 30/129 |
| 2,541,158 A | * | 2/1951 | Gardiner ...................... 294/12 |
| 2,805,883 A | * | 9/1957 | Sauvago ....................... 294/26 |
| 2,876,694 A | | 3/1959 | Thomas ..................... 99/421 A |
| 2,935,013 A | | 5/1960 | Onori ........................... 99/419 |
| 6,286,418 B1 | | 9/2001 | Berke et al. ............... 99/421 A |

FOREIGN PATENT DOCUMENTS

GB    2204481    11/1988

* cited by examiner

*Primary Examiner*—Dean J. Kramer
(74) *Attorney, Agent, or Firm*—Wood, Herron & Evans, L.L.P.

(57) ABSTRACT

A cooking skewer assembly comprising an elongate shaft (15) having a free end and an opposite end and a handle assembly (30) slidable along the shaft (15) from the free end to the opposite end. The handle assembly (30) comprising a grip (35) portion and a food pusher (55), the grip (35) portion being formed of an open heat dissipating wire construction.

14 Claims, 3 Drawing Sheets

SKEWER

FIELD OF INVENTION

This invention relates to a skewer for cooking foodstuffs and more particularly to a skewer adapted to limit the heat build up in the handle.

BACKGROUND OF THE INVENTION

Skewers used to cook food in open fires and/or barbecues typically have a handle so that the user is able to pick up the skewer and to rotate the skewer and food on the barbecue for even cooking. Certain design of barbecue or cooking skewers also have pusher members fitted to the shaft of the skewer before the food is put on and slidable off the shaft to aid in removing the food from the skewer in a controllable manner. A problem with such designs is that either the handle gets hot such that the user burns themselves when attempting to pick up the skewer and/or the pusher member becomes hot so that when the user attempts to push product from the skewer, they burn their hand. Whilst some products attempt to address these issues via choosing different materials and/or use of removable handles, these have their own drawbacks, the present invention seeks to provide a skewer of improved design.

SUMMARY OF INVENTION

According to a first aspect of the present invention there is provided a cooking skewer assembly comprising an elongate shaft having a free end and an opposite end, and a handle assembly slidable along the skewer from the free end to the opposite end comprising a grip portion and a food pusher, the grip portion being formed of an open heat dissipating wire construction.

Preferably the grip will be in the form of a helical coil, the helical coil having air gaps between the coils to allow for airflow around the wires. Connection members being of wire frame construction may connect the grip to the pusher.

In a preferred embodiment a handle engaging means is formed at the opposite end of the skewer. A lobe may be formed at the opposite end of the shaft and incorporates the handle engaging means being at least one indent formed in the lobe. Preferably the grip portion has at its end at least one wire loop which sits into the at least one indent.

In the preferred embodiment the pusher is formed of a plate having an opening through which the shaft extends. Preferably the opening through the pusher has substantially the same cross section as the skewer shaft. Even more preferably the opening through the pusher and the shaft are both of non-circular cross-section, to prevent the handle rotating around the shaft when in use.

DETAILED DESCRIPTION

Figure 1:
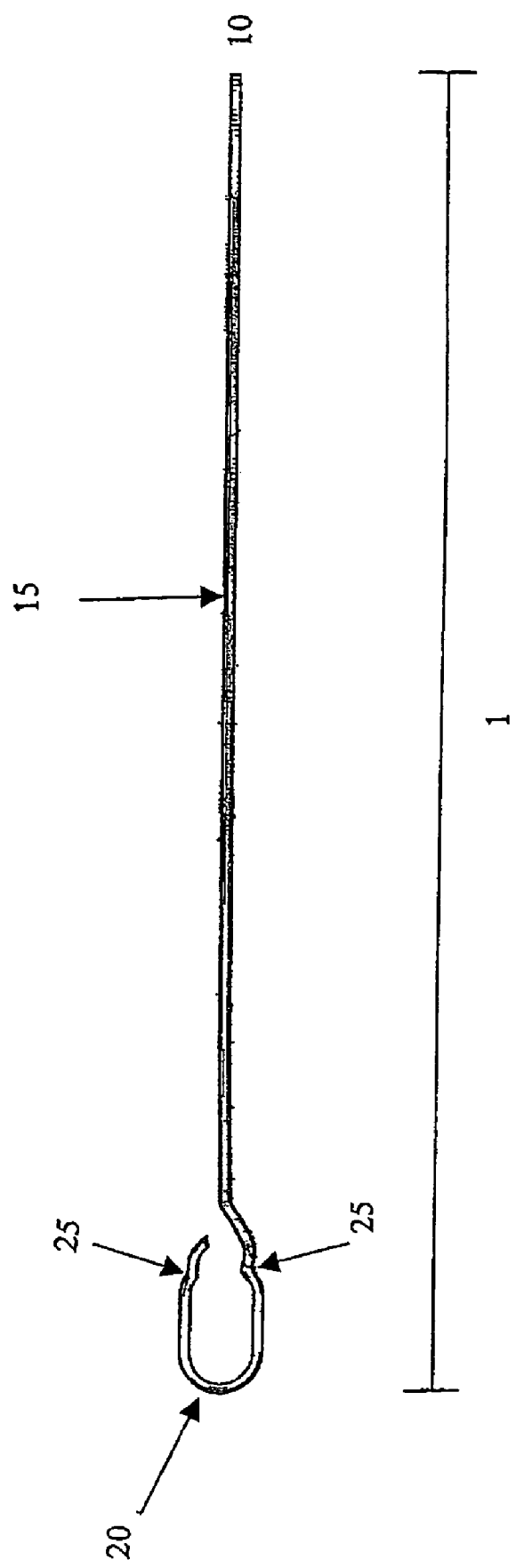
FIG. 1 is a side view of the skewer of the preferred embodiment of the invention.
Figure 2:
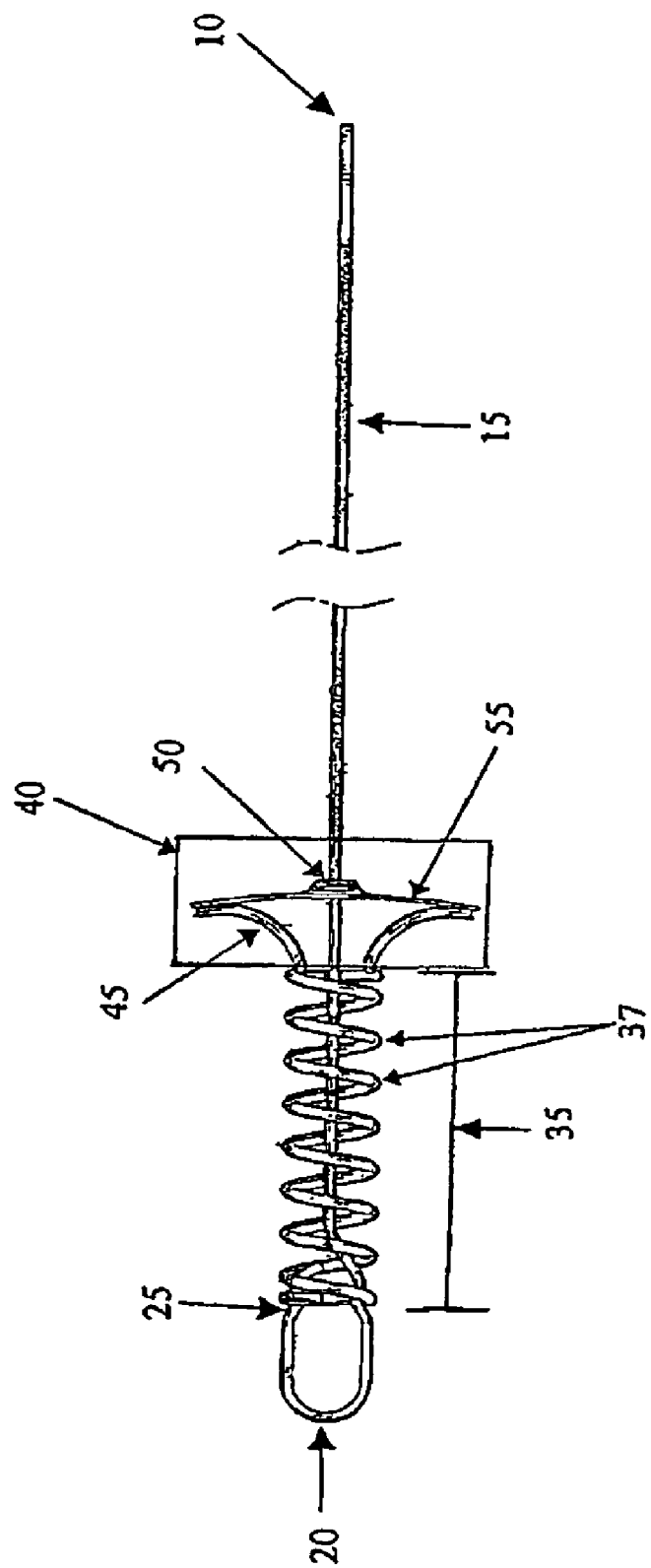
FIG. 2 is a side view of the skewer and handle assembly of the preferred embodiment.

Referring now to FIGS. 1 to 4 a preferred embodiment of the skewer according to the present invention is shown. The skewer assembly consists of a skewer generally designated 1 comprising a shaft 15 and a point 10 at a first free end. At an opposite second end the shaft 15 is bent into a lobe 20. The handle assembly 30 includes a grip portion 35 and a pusher member 40.

The skewer 1 may have a variety of different cross sections. It is preferred that the cross section of the skewer 1 is square or flat to prevent the food rotating around the shaft 15. In a preferred embodiment the shaft 15 has an elongate rectangular cross section.

The skewer 1 should be made out of an appropriate material such as food grade stainless steel. The person skilled in the art will appreciate that a number of other materials are suitable for use in this application. The point 10 of the free end of the skewer is designed to penetrate the food to be cooked. The shaft 15 also needs to be rigid enough so that when lifted by the handle assembly 30 the shaft is capable of supporting the weight of the food without bending significantly.

In the preferred embodiment, the second end of the shaft 15 is formed into a lobe 20 by bending the shaft around a radius and back upon itself into a loop or a near-loop. The lobe 20 has the purpose of allowing the user to hold the skewer 1 when the handle assembly 30 is not fitted. The lobe 20 also incorporates engaging means 25, in the form of a pair of opposed indents 25 at opposite sides of the lobe 20.

Figure 3:
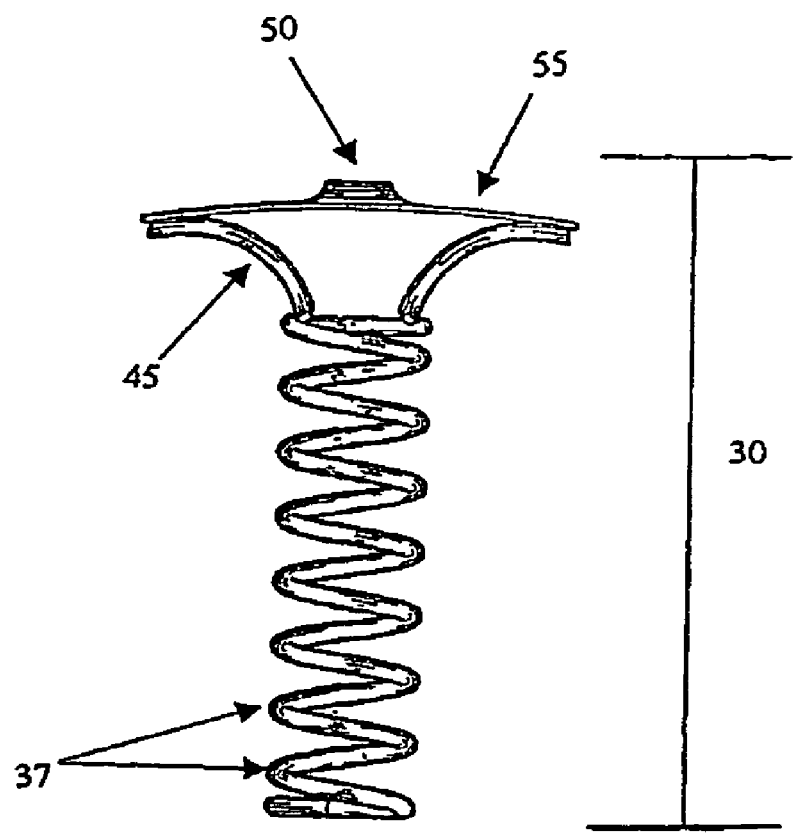
FIG. 3 is a side view of the handle assembly.
Figure 4:
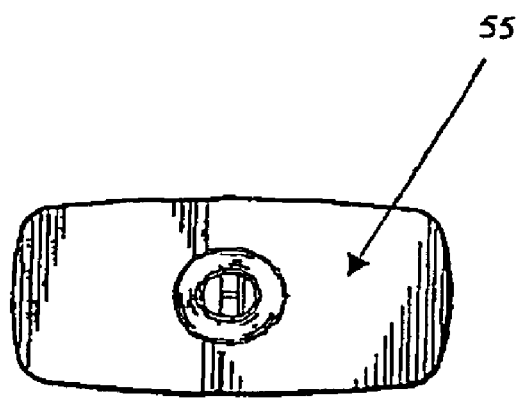
FIG. 4 is an end view of a skewer and handle assembly.

For the sake of clarity FIG. 3 shows the removable handle assembly 30 without the shaft 15. The grip portion 35 is constructed using a metal wire frame construction, which comprises an open helical coil 37, the coils 37 being wound such that adjacent coils 37 do not touch each other for a substantial part of the grip portion 35, and defining a hollow axis.

The open wire frame construction allows for good airflow between coils 37 and thereby improved heat flow from of the grip 35. The shaft engaging indents 25 receive the end most coils of the grip, the springiness of the loop helping to firmly but releasably retain the handle assembly 30 on the skewer 1.

At a second end of the handle assembly 30 there is a pusher member 40. The pusher member 40 includes a sheet of material forming a pusher face 55, and is joined to the grip portion 35 by connection members 45, in the form of a pair of bent U-shaped wire elements. These are preferably welded or soldered to the grip portion 35 and pusher member 40. The pusher face 55 of the pusher member 40 has an opening 50 to allow the shaft 15 to pass through, when the handle assembly 30 is placed over the skewer 1. It may be arranged that the opening 50 has substantially the same cross section as the shaft 15 so that the handle assembly 30 cannot rotate around the shaft 15.

Prior to using the heat-dissipating skewer for cooking the components are assembled by sliding the handle assembly 30 onto the shaft 15, the point 10 of the shaft being inserted into the handle assembly 30 and the handle assembly 30 is slid down the shaft 15 until the handle assembly 30 reaches the lobe 20. The handle assembly 30 is then releasably engaged with the engaging means 25 on lobe 20.

Once the food has been placed onto the skewer the skewer is placed onto a barbecue or open fire or under a grill so as to allow the food to cook. The user is able to pick up the skewer assembly by the grip portion 35, which remains relatively cool and manipulate the skewer and food so that the food can be cooked evenly. After cooking the user can readily remove the food from the skewer by grasping the grip portion 35 and forcing the handle assembly 30 along the skewer length, the pusher member 40 serving to push the food off the skewer. The open structure of the wire frame of the grip portion 35 and its separation from the pusher member 40, which also acts to deflect a certain amount of heat, serves to keep the grip portion 35 cool.

It would be understood by a person skilled in the art that a variety of other shapes and constructions may be employed that still fall within the scope of the present invention. For example, the lobe may be any number of shapes and may not have the engaging means directly incorporated. The engaging means may be adjacent to the lobe or even on the skewer shaft itself. The engaging means is not intended to be limited to the indents on the lobe but could be any mechanism that can releasably engage with the handle assembly, such as clip or snap fitting mechanisms Other arrangements of open wire frame constructions could equally be envisaged, such as a pair of rings at opposite ends and a series of longitudinal members there-between.

The invention claimed is:

1. A cooking skewer assembly comprising:
    an elongate shaft having a free end and an opposite end, and
    a handle assembly slidable along the shaft from the free end to the opposite end, the handle assembly comprising:
        a grip portion formed of an open heat dissipating wire construction, and
        a food pusher coupled to the grip portion,
    wherein the opposite end of the shaft is formed into a loop provided with at least one indent with which the handle assembly engages.

2. A cooking skewer assembly according to claim 1 wherein the grip portion comprises a helical wire frame.

3. A cooking skewer assembly according to claim 2 wherein the pusher is joined to the helical wire frame by an open wire frame construction whereby the helical wire frame is separated from the pusher.

4. A cooking skewer assembly according to claim 1 wherein the grip portion has at its end a wire coil which engages the at least one indent.

5. A cooking skewer assembly according to claim 1 wherein the pusher is formed of a plate having an opening through which the shaft extends.

6. A cooking skewer assembly according to claim 1 wherein the shaft is formed with a non-circular cross-section.

7. A cooking skewer assembly according to claim 6 wherein the pusher includes an opening having a non-circular cross section and through which the shaft extends, the non-circular cross section of the opening being the same as the non-circular cross section of the shaft.

8. A cooking skewer assembly comprising:
    an elongate shaft having a free end and an opposite end, and
    a handle assembly slidable along the shaft from the free end to the opposite end, the handle assembly comprising:
        a grip portion formed of an open heat dissipating wire construction in the form of a helical wire frame, and
        a food pusher coupled to the grip portion, wherein the pusher is joined to the helical wire frame by an open wire frame construction whereby the helical wire frame is separated from the pusher.

9. A cooking skewer assembly according to claim 8 wherein the opposite end of the shaft is formed with handle engaging means.

10. A cooking skewer assembly according to claim 9 wherein the opposite end of the shaft is formed into a loop provided with at least one indent with which the handle assembly engages.

11. A cooking skewer assembly according to claim 10 wherein the grip portion has at its end a wire coil which engages the at least one indent.

12. A cooking skewer assembly according to claim 8 wherein the pusher is formed of a plate having an opening through which the shaft extends.

13. A cooking skewer assembly according to claim 8 wherein the shaft is formed with a non-circular cross-section.

14. A cooking skewer assembly according to claim 13 wherein the pusher includes an opening having a non-circular cross section and through which the shaft extends, the non-circular cross section of the opening being the same as the non-circular cross section of the shaft.

* * * * *